INVENTORS
MAX L. HILL
and
DERRIL D. GRANGER
BY Strauch, Nolan & Neale
ATTORNEYS

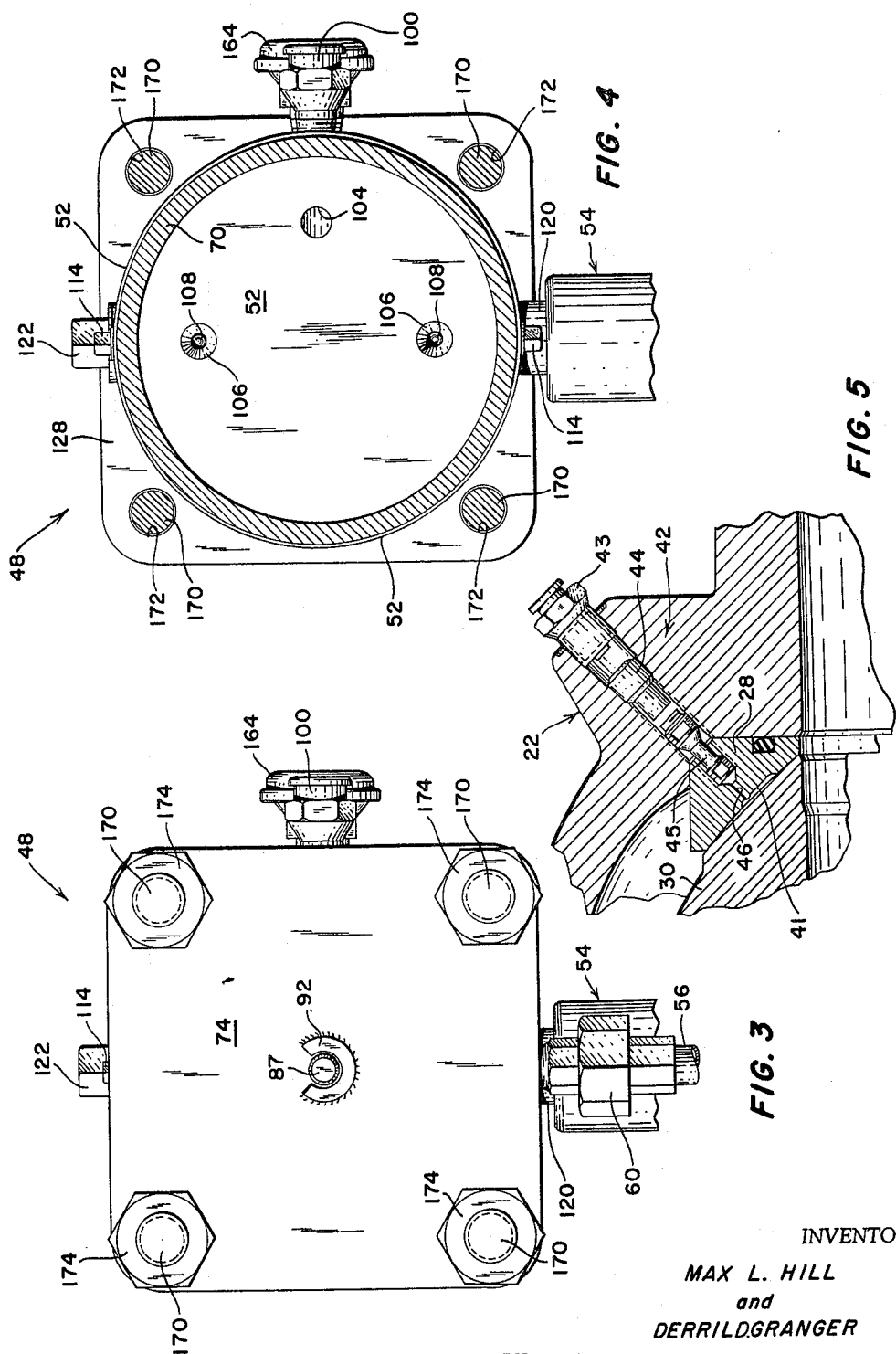

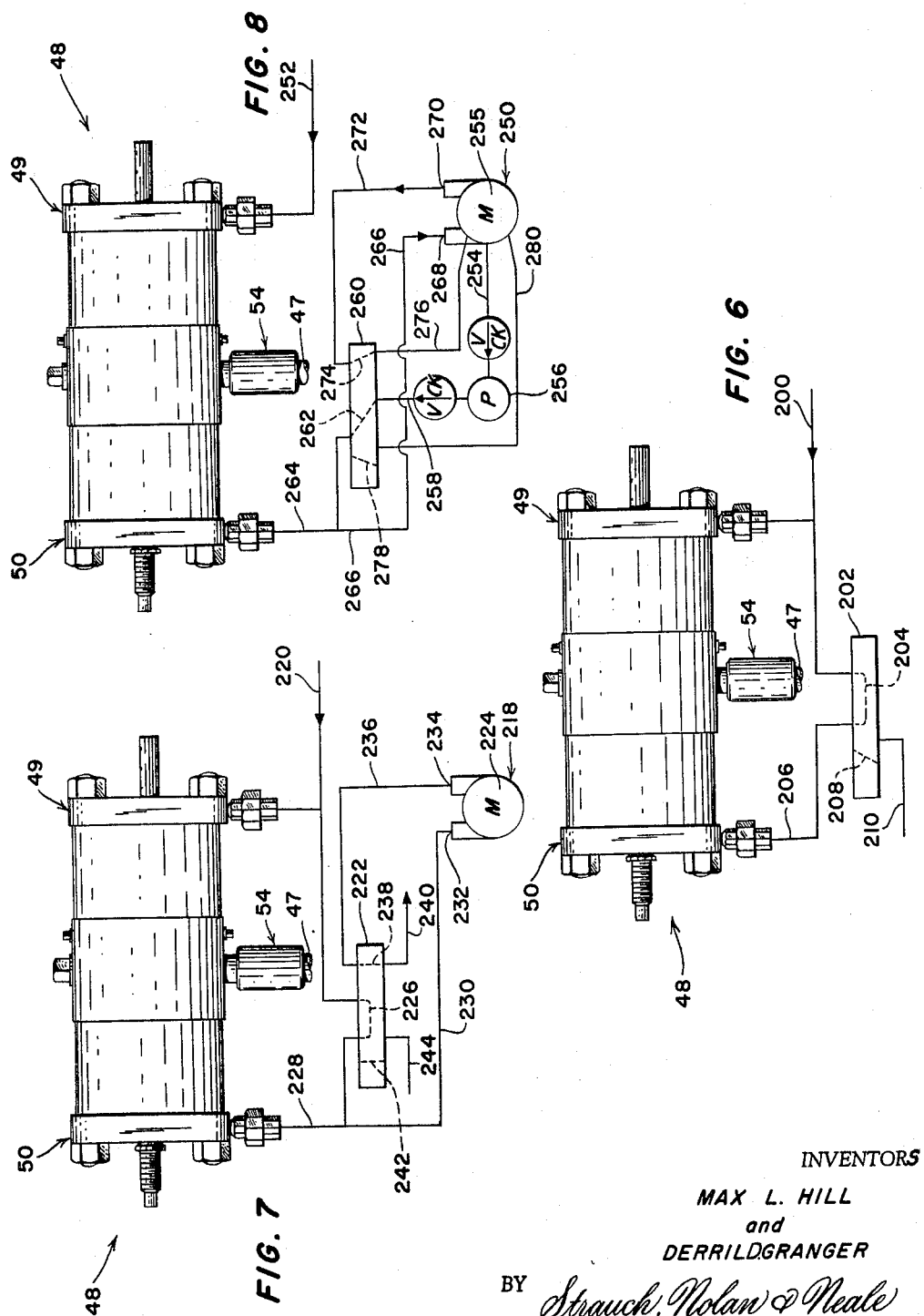

INVENTORS
MAX L. HILL
and
DERRILD GRANGER
BY Strauch, Nolan & Neale
ATTORNEYS

INVENTORS
MAX L. HILL
and
DERRILD GRANGER
BY *Strauch, Nolan & Neale*
ATTORNEYS 3,280,835
VALVE JOLT SEALANT INJECTOR
Max L. Hill, Gibbon, Nebr., and Derril D. Granger, Wadsworth, Ohio, assignors to Rockwell Manufacturing Company, Pittsburgh, Pa., a corporation of Pennsylvania
Filed May 23, 1963, Ser. No. 282,602
20 Claims. (Cl. 137—246.11)

This invention relates to apparatus and methods for injecting a lubricating sealant into pipeline valves and particularly to apparatus and methods for jolt injecting such sealant to facilitate the operation of pipeline plug valves.

It is conventional to utilize plug valves in pipelines to control the flow of a fluid, such as a combustible gas, therethrough. It is desirable to provide and maintain a film of plastic or semi-fluid sealant material at the plug-seat interface, that is, between the mating surfaces of the plug-like valve member and the valve seats, to prevent leakage therebetween. This sealant also functions as a lubricant to reduce torque during valve opening and closing.

Devices to replenish and maintain such a sealant film are known, as shown, for example, in United States Letters Patent No. 3,010,539 to Goff et al. wherein a plug valve lubricator is provided to automatically maintain a continuous, constant-pressure supply of sealant to the plug-seat interface. As indicated in that patent, the sealant supply pressure must be kept within certain limits, that is, high enough that a sealant film will be maintained despite the high fluid pressure in the pipeline and yet not so high that substantial quantities of sealant will be forced out into the pipeline stream.

Although the sealant system of the above patent is effective to prevent leakage between the plug and the seat, it fails to provide a solution to the following problem; when plug valves are closed, the upstream fluid pressure, which may be of the order of 1500 p.s.i., will seat the valve member upon the downstream valve seat with a force sufficiently great that any initial film of sealant therebetween may eventually be squeezed out and substantially metal-to-metal contact will occur. As a result of this direct contact or as a result of any corrosion between the plug and the seat, the torque required to break the adhesive and cohesive forces between the plug and the valve seat may be so great that the valve actuator, be it manual or power drive, will have insufficient power to initiate valve movement away from the closed position.

To facilitate valve operation under the above conditions, it has heretofore been known to provide plug valves with devices to introduce sealant to the plug-seat interface at high pressures to effect a hydraulic jacking of the plug away from the seat to separate the mating surfaces thereof. As shown in United States Letters Patent No. 2,788,015 to Scherer, this jacking is accomplished by adding sealant with a grease gun or by turning a screw into a sealant reservoir. Such a system is effectively limited to manually actuated valves wherein a person operating the valve may manually increase sealant supply pressure by these means prior to attempting to open the plug valve. However, where the valves are power operated and remotely controlled, this periodic manual lubrication system is obviously unsatisfactory; however, it is of greatest importance in a remotely controlled pipeline system that these valves operate properly and immediately when called upon to do so in order to avoid dangerous and expensive malfunctions in the system.

Accordingly, it is a primary object of this invention to provide improved plug valve sealant injection, which is adapted for remote operation, not only to maintain a sealing film between the valve member and the valve seat but also to intermittently effect a jacking action therebetween to facilitate valve opening.

To accomplish this objective, the present invention provides a constant pressure sealant reservoir connected to the conventional sealant passages in the valve seat of a plug valve. This reservoir is preferably a cylinder having a dividing piston with a sealant compartment on one side thereof connected to the valve seat passages and with an operating fluid compartment on the other side thereof. The operating fluid pressure source for the constant pressure sealant reservoir may preferably be the main pipeline.

To effect the required jacking, an intensifier or jolt mechanism is incorporated in the apparatus of the present invention to intermittently increase the pressure at which sealant is supplied to the downstream seat of the plug valve. This intensifier mechanism is preferably a plunger or ram operating in a sealant filled chamber located downstream of the constant pressure reservoir to increase the pressure of the sealant supplied to the valve. Check valves are included between the ram chamber and the reservoir to prevent reverse flow to the reservoir during actuation of the intensifier ram. The ram is directly actuated by a fluid actuated piston which is preferably several times the cross-sectional area of the ram so that the required pressure intensification may be obtained through a mechanism operated by the same pressure source as utilized for the constant pressure reservoir.

The operating fluid for the intensifier may be controlled by a three-way valve which alternately applies pressure to the ram piston to intensify the sealant supply pressure and then vents the ram piston to atmospheric pressure to allow the ram to retract under the pressure of sealant refilling the ram chamber from the constant pressure reservoir. Alternatively, control of the intensifier operating fluid may be interrelated with the main valve actuator controls so that the intensifier automatically operates whenever the valve actuator controls call for a valve opening operation.

In pipeline valves wherein the direction of flow may be reversed from time to time, the sealant injector of the present invention may also incorporate an automatic seat selector operated by pipeline pressures taken on either side of the main valve to ensure that sealant is directed only to the downstream valve seat where jacking is required.

Accordingly, other objects of the present invention include:

(1) The provision of a jolt sealant injector for plug valves having a constant pressure sealant supply sufficient to maintain a normal film of sealant at the plug-seat interface and having a pressure intensifier to increase the supply pressure of sealant to effect a jacking of the plug away from the valve seat to facilitate opening of the valve;

(2) The provision of such a jolt sealant injector wherein the constant pressure sealant supply is operated at pipeline pressure;

(3) The provision of such a jolt sealant injector wherein the pressure intensifier is automatically operated whenever the valve actuator is operated to open the valve;

(4) The provision of a jolt sealant injector for plug valves which are adapted for reversible fluid flow having means to automatically direct the sealant only to the downstream valve seat;

(5) The provision of a jolt sealant injector for plug valves wherein the amount of sealant injected at intensified pressures may be preselected;

(6) The provision of a jolt sealant injector for plug valves wherein the pressure intensifier is automatically refilled from a constant pressure supply reservoir;

(7) The provision of a jolt sealant injector for plug valves having a check valve downstream from the pressure intensifying mechanism to prevent expansive return flow from the sealant supply line to the pressure intensifier upon deactivation thereof;

(8) The provision of an improved method for introducing sealant between the valve seat and valve member of a plug valve; and (9) The provision of a two-pressure method of introducing sealant in plug valves to the plug-seat interface to replenish and maintain a sealant film thereat and to accomplish jacking of said plug away from said seat during a valve operating operation.

These and other objects of the present invention will appear from the following description and the appended claims when read in conjunction with the accompanying drawings wherein:

FIGURE 3 is an end view of the jolt injector of FIGURE 1;

FIGURE 4 is a vertical, transverse cross section of the jolt injector taken on line 4—4 in FIGURE 2;

FIGURE 5 is a fragmentary, enlarged cross section of the spherical plug valve of FIGURE 1 showing the sealant passages leading from the exterior of the valve body to the plug-seat interface;

FIGURE 6 is a schematic illustration of the jolt sealant injector of FIGURE 1 connected for manual or remote control operation;

FIGURE 7 is a schematic illustration of the jolt sealant injector of FIGURE 1 connected for automatic operation in a pneumatic valve actuator system;

FIGURE 8 is a schematic illustration of the jolt sealant injector of FIGURE 1 connected for automatic operation in a hydraulic valve actuator system;

Figure 1:
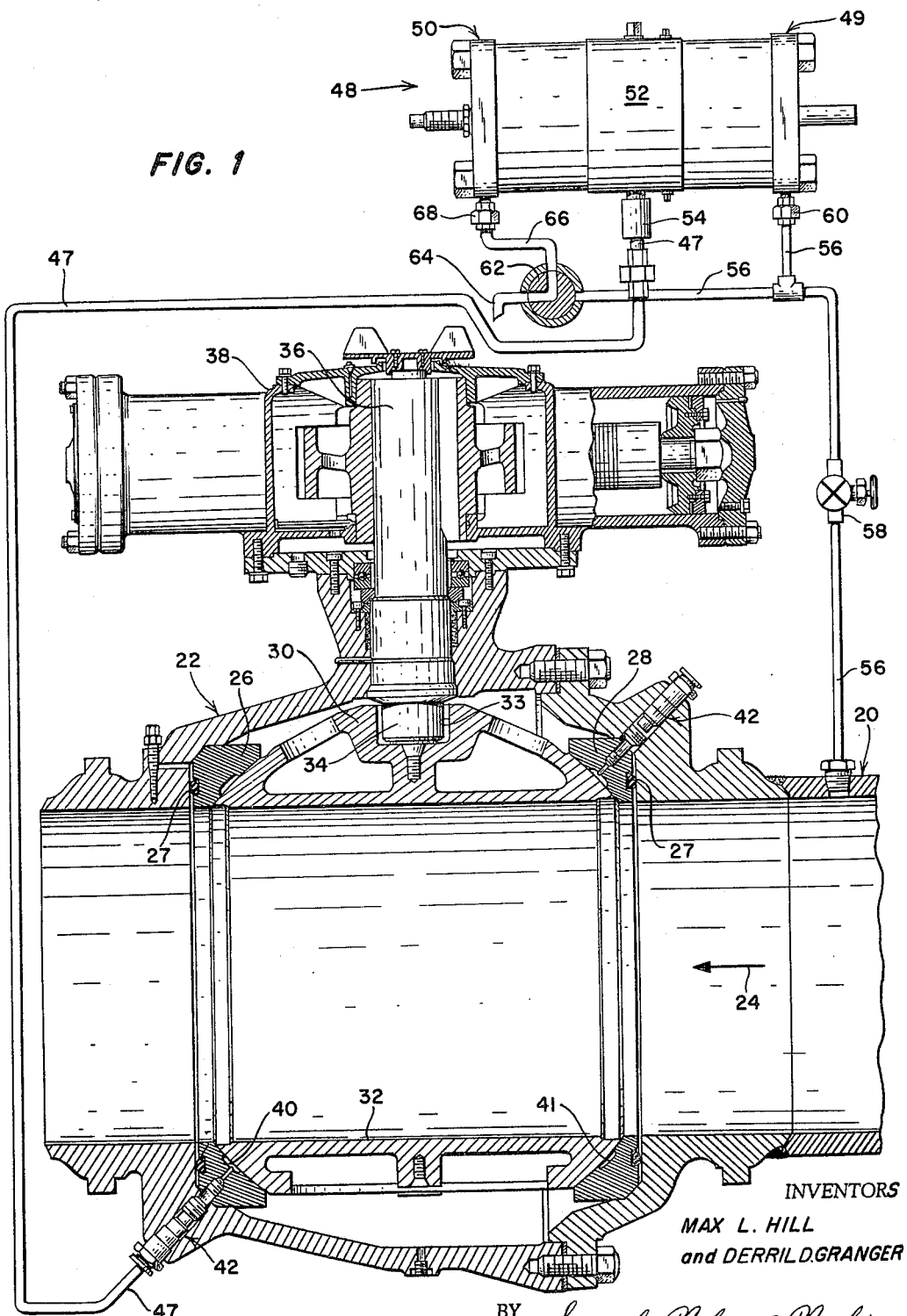
FIGURE 1 is a partially sectioned, general view of the jolt injector of the present invention in combination with a spherical plug valve.

As shown generally in FIGURE 1, a pipeline 20 has a conventional spherical plug valve 22 therein to control a flow of fluid in the pipeline indicated by arrow 24. Plug valve 22 includes annular spherical valve seats 26 and 28 supporting a spherical plug or ball 30 having a through fluid passage or bore 32. Resilient O-rings 27 in grooves in the rear surfaces of the seats 26 and 28 constantly urge both ring seats toward the plug 30 and at the same time seal against line pressure leakage around the ring seats. Ball 30 has an elongated slot 33 at its upper pole to receive a tang 34 of valve stem 36. Valve stem 36 is rotated through approximately 90 degrees to open and close valve 22 by any suitable actuator either manual or power driven, such as the rack and pinion, hydraulic-cylinder power actuator 38 shown in FIGURE 1.

To conduct sealant to annular surface grooves 40 and 41 formed in valve seats 26 and 28, respectively, to provide for a film of sealant between the mating surfaces of the valve seats and the ball, valve body sealant conductor assemblies 42 are conventionally provided in valve 22. As best shown in FIGURE 5, the conductor assemblies 42 each include a conventional grease fitting 43 which may include a check valve (not shown), an additional check valve assembly 44, and a flexible connecting device 45 which sealingly conducts sealant to bore 46 in an annular valve seat and yet permits axial motion of the valve seat with respect to the valve body. The above described structure is known, but according to the present invention, it is supplied with pressurized sealant from a jolt sealant injector 48 through a sealant conduit 47 connected to the valve sealant conductor assembly 42 associated with the downstream valve seat 26.

*Jolt sealant injector 48*

As shown generally in FIGURE 1, sealant injector 48 includes a supply reservoir assembly 49 and an intensifier assembly 50 connected on either side of a central cylindrical injector body 52 which is in turn connected by a check valve assembly 54 to sealant conduit 47 leading to the downstream valve seat 26. Jolt injector 48 is connected to pipeline 20 upstream of valve 22 by an operating fluid conduit 56 having a manual shutoff valve 58. Conduit 56 connects directly to a pipe fitting 60 in the sealant reservoir assembly 49 and indirectly to pipe fitting 68 in the intensifier assembly 50 through a three-way valve 62 having an exhaust connection 64 and an intensifier connection 66.

Figure 2:
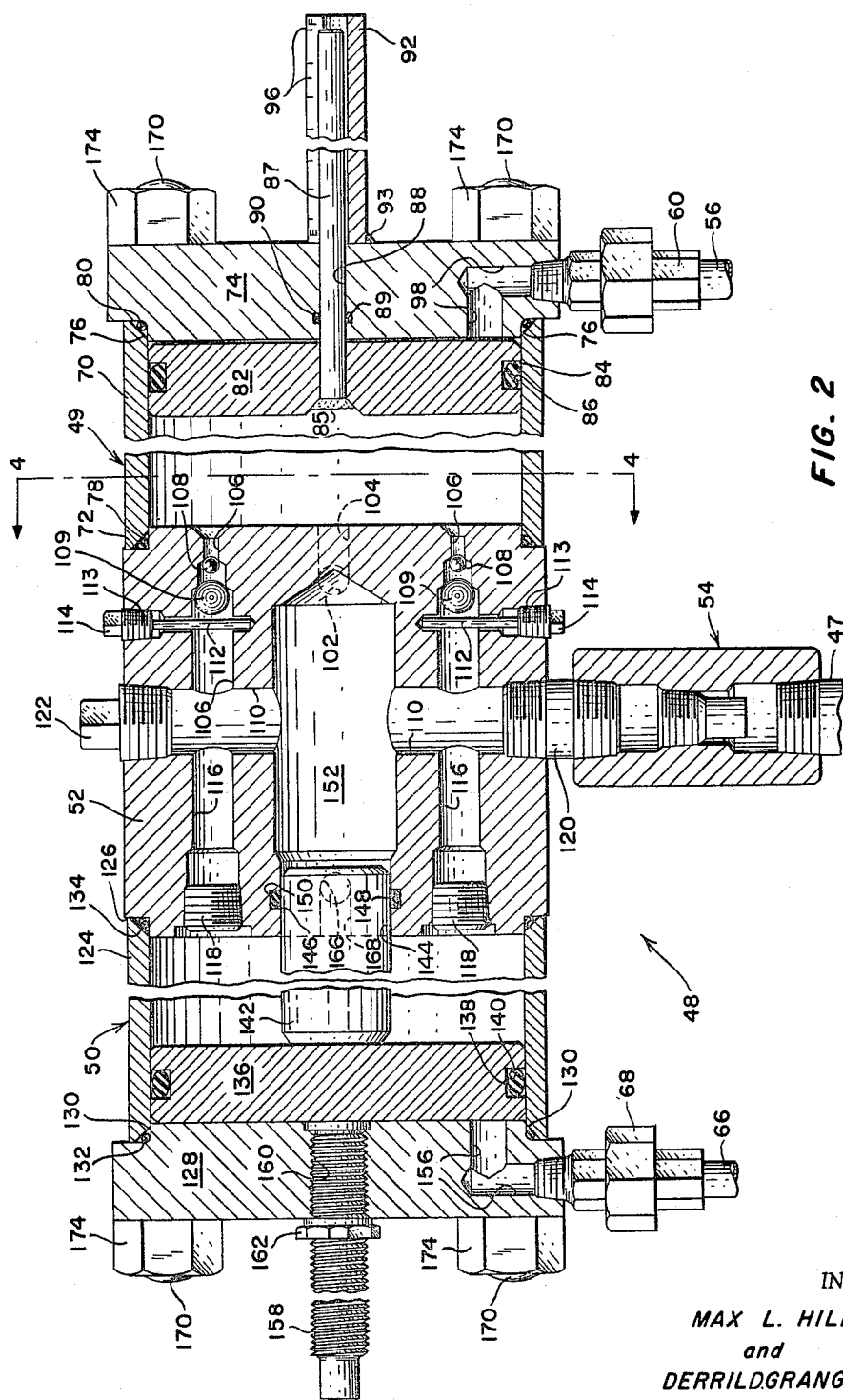
FIGURE 2 is a vertical, longitudinal cross section through the jolt injector of FIGURE 1.

As shown in greater detail in FIGURE 2, sealant supply reservoir assembly 49 includes a tubular reservoir cylinder 70 fitting within an annular recess 72 provided at the periphery of one end of central injector body 52. The opposite end of cylinder 70 is closed by a generally rectangular end cap 74 having a central, circular boss 76 formed on the inner surface thereof to fit within the cylinder 70. Both ends of reservoir cylinder 70 are internally beveled to provide operative clearance for O-rings 78 and 80 interposed between the reservoir cylinder and the injector body 52 and end cap 74, respectively.

A reservoir piston 82 is positioned within reservoir cylinder 70 between the end cap and the injector body. An annular groove 84 in the periphery of piston 82 contains an O-ring 86 suitably compressed during assembly to ensure a seal between the piston and the cylinder.

A longitudinally extending indicator rod 87 is securely fixed centrally in piston 82 by a weld 85 and extends through a bore 88 in end cap 74. A seal between rod 87 and bore 88 is provided by means of an annular groove 89 in the wall of bore 88 containing an O-ring 90 in contact with the rod. An indicator gage tube 92 is securely fixed to the external side of end cap 74 by weld 93 so as to surround bore 88. The tube is partially cut away, as shown in FIGURE 3, through its length so that the relative position of indicator rod 87 may be observed therein. Suitable gage marks 96 are provided on a surface of gage tube 92 to indicate the quantity of sealant remaining in reservoir assembly 49 between piston 82 and injector body 52.

A pipe fitting 60 threadedly engages end cap 74 and connects with bores 98 therein to supply operating fluid from conduit 56 to the space between reservoir piston 82 and end cap 74 thereby maintaining the sealant within reservoir assembly 49 under constant pressure.

Sealant is introduced into reservoir assembly 49 by a conventional check-valved grease fitting 100, shown in FIGURES 3 and 4, threaded into a radial bore 102 provided in the outer cylindrical surface of injector body 52. Bore 102 connects with the interior of reservoir cylinder 70 by means of a longitudinally extending bore 104 in the injector body.

Fluid pressure acting on piston 82 urges the sealant within reservoir 70 through reservoir outlet bores 106 with ball checks 108 and 109 and into the central, diametrically extending main sealant passage 110 extending through injector body 52. Ball checks 109 are retained in position adjacent their respective seats in the multi-diameter bores 106 by transverse pins 112 extending across bores 106. Pins 112 are inserted through threaded bores 113 and are retained in position by pipe plugs 114. Small ball checks 108 are retained adjacent their respective seats in bores 106 by the large ball checks.

Longitudinally extending bores 106 extend through injector body 52 to the intensifier end thereof in order to facilitate manufacture of the injector body. The resulting bore extensions 116 are sealed off at the intensifier end by pipe plugs 118 threaded therein.

The sealant conducting conduit 47 with its associated double ball check valve assembly 54 may be connected to either end of diametric cross bore 110 by a threaded pipe connection 120. The opposite end of the bore 110 is then closed by means of suitable pipe plug 122.

As further shown in FIGURE 2, pressure intensifier assembly 50, at the other end of jolt sealant injector 48, includes a tubular intensifier cylinder 124 which fits within an annular recess 126 at the periphery of the intensifier end of injector body 52. The outer end of intensifier cylinder 124 is closed by generally rectangular end cap 128 having a central circular boss 130 formed on the inner surface thereof to fit within cylinder 124. Like reservoir cylinder 70, intensifier cylinder 124 has internal bevels at either end thereof to sealingly retain rubber O-rings 132 and 134 between the ends of the cylinder and end cap 128 and sealant injector body 52, respectively.

An intensifier piston 136 is contained within intensifier cylinder 124 and has an annular groove 138 in the periphery thereof to retain O-ring 140 in compressed sealing engagement with the internal surface of the intensifier cylinder.

Piston 136 abuts an intensifier ram 142 extending through a central bore 144 provided in the injector body and being retained in sealing engagement therein by a backup ring 146 and an O-ring 148 contained in an annular groove 150 provided in body 52 around the periphery of bore 144. Ram 142 is adapted to slide within bore 144 to extend into a longitudinally extending, cylindrical ram chamber 152 formed in the interior of injector body 52 and which intersects and connects with the diametric main sealant passage 110. Chamber 152 is of slightly greater diameter than ram 142 so as to provide annular clearance therebetween upon extension of the ram into the chamber.

Pipe fitting 68 of intermittently pressurized conduit 66 is threaded into intensifier end cap 128 and connects with the space within intensifier cylinder 124 between piston 136 and end cap 128 by means of bores 156 in the cap.

End cap 128 is further provided with a longitudinally extending adjusting screw 158 threaded through a central bore 160 provided therein. Screw 158 may be adjustably threaded into the piston space within cylinder 124 to limit the position to which intensifier piston 136 may return toward the end cap as more fully described below. A locking nut 162 is provided to securely maintain adjusting screw 158 in a selected position.

Intensifier assembly 50 further includes a breather fitting 164, as shown in FIGURES 3 and 4, threaded into a radial bore 166 provided in sealant injector body 52 adjacent intensifier cylinder 124. Radial bore 166 communicates with a longitudinal bore 168 which opens into the space within cylinder 124 between piston 136 in the injector body 52 to vent the space to atmosphere.

As shown in FIGURES 2 to 4, the various components of the reservoir assembly 48 and intensifier assembly 50 are secured in assembled relationship with injector body 52 by longitudinally extending bolts 170 which extend through suitable bores 172 (FIGURE 4) provided in the corners of generally rectangular end caps 74 and 128 and have nuts 174 at either end thereof. As shown in FIGURE 4, bolts 170 extend externally along tubular cylinders 70 and 124 and cylindrical body 52 of the sealant injector.

*Operation*

In operation, the jolt sealant injector 48 of the present invention is periodically filled with a sealant material through grease fitting 100. The sealant passes through bores 102 and 104 into the space between reservoir piston 82 and the injector body thus forcing piston 82 and indicator rod 87 toward end cap 74 until it abuts the cap, at which time the reservoir indicator rod indicates a full condition.

The reservoir piston is biased toward injector body 52 by the pressurized operating fluid introduced through end cap 74; in the installation shown in FIGURE 1, this is pipeline fluid. This bias on piston 82 maintains the sealant in reservoir cylinder 70 under pressure and urges it through the check-valved bores 106 into the transverse central passage 110 in the injector body. Sealant then feeds from the passage 110, through the double check valve assembly 54, through conduit 47 to valve body conductor assembly 42 at the downstream valve seat. Thus a supply of sealant is maintained in grooves 40 of the down-stream valve seat at a pressure which balances that of the pipeline. This pressure is sufficient to maintain a sealant film between valve seat 26 and ball 30 when the valve is in an open position as shown in FIGURE 1.

However, when valve plug 30 is in a 90° shifted closed position, the differential pressure between the upstream and the downstream side of the valve creates a tremendous force displacing plug 30 toward ring seat 26 which tends to squeeze the sealant film from between the downstream valve seating surfaces. As a result, substantially metal-to-metal contact between the ball and valve seat may result, and if the ball remains in a closed position for substantial time, some corrosion activity may occur which combined with the effect of line pressure urging the plug downstream will make it even more difficult to slide the surface of the ball relative to the valve seat. The mating surfaces in this condition are effectively interlocked by minute corroded, machined, or molecular surface irregularities.

In order to open the valve in this condition without resort to excessive torques, a jolt or a pressure intensification of the sealant supplied to annular grooves 40 will be effective to radially separate the sperical surfaces sufficiently to disengage the above interlocks so that normal torque forces can effect plug rotation. To produce this jolt or pressure intensification of sealant, three-way valve 62 is turned from the position shown in FIGURE 1 so as to connect pipeline pressure conduit 56 with intensifier conduit 66 thereby applying pipeline pressure to the left-hand side (as seen in FIGURE 2) of intensifier piston 136. The right-hand side of the piston is subjected to atmospheric pressure as the intensifier cylinder 124 is vented to atmosphere at the injector body end through breather 164. The differential pressure thus applied to piston 136 will urge it and its associated ram 142 to the right as seen in FIGURE 2.

In one preferred embodiment, the cross sectional areas of the piston and the ram are such that a ten to one pressure intensification is obtained by the piston-ram mechanism. Therefore, the sealant which normally fills ram chamber 152 will be pressurized to ten times line pressure, that is, to the order of 15,000 p.s.i. This increased pressure of the sealant in injector body 52 causes ball checks 108 and 109 to close off ports 106 leading back to the sealant reservoir.

The extremely high pressure thus present in ram chamber 152 is transmitted substantially undiminished through sealant conduit 47 to valve seat groove 40 where it is effective to discharge sufficient sealant at high pressure to separate the mating valve surfaces and to reestablish the desired film of lubricant between the valve ball and the valve seat. Because of the intense pressures developed by the ram during the intensifier operation, sufficient sealant will normally be discharged at the valve seat to permit the intensifier piston and ram to complete a full stroke during a valve opening operation.

When the pipeline valve 22 is open, intensifier control valve 62 may be returned to the normal position shown in FIGURE 1 to vent the left side of intensifier piston to atmosphere. With dissipation of the pressure differential across piston 136, the pressurized sealant in ram chamber 152 urges ram 142 to the left, as seen in FIGURE 2. As the pressure in ram chamber 152 falls off, ball checks in assembly 54 close to prevent reverse flow therethrough due to the expansive tendency of the sealant in conduit 47 which may remain at a pressure above the pipeline pressure present in the sealant reservoir. As the pressure in ram chamber 152 drops below reservoir chamber pressure, ball checks 108 and 109 reopen to allow ram chamber 152 to refill with sealant at pipeline pressure and thus urge ram 142 to complete its return stroke.

Whenever the pressure of the sealant downstream of check valve assembly 54 drops below supply reservoir pressure due to normal feeding of the pressurized sealant-in conduit 47 to the main valve 22, the ball checks of assembly 54 will reopen to permit through feeding to the valve from the reservoir.

Inasmuch as the proper quantity of sealant that should be jolt injected to jack a plug from a valve seat to facilitate an opening operation varies with the size of the valve to which the injector of the present invention is applied, an intensifier stroke adjusting screw 158 is provided. Adjustment of this screw is most easily made during an operating cycle of the intensifier. When the adjusting screw 158 is screwed into cap 128 to extend into intensifier cylinder 124, it will be effective to limit the return stroke of intensifier piston and the resulting refilling of the ram chamber; the quantity of sealant injected during a subsequent intensifier operation will be thus reduced.

In one specific embodiment of the present jolt injector, the maximum jolt capacity, with the adjusting screw 158 positioned as shown in FIGURE 2, is 5½ cubic inches of sealant for each intensifier stroke. Adjusting screw 158 may then be positioned to reduce this quantity as desired, for example, 2½ to 3 cubic inches for a 36-inch ball valve, 1 to 1½ cubic inches for a 16-inch ball valve.

*Installation modifications*

FIGURES 6, 7, and 8 show various modifications of the installation of the jolt injector 48 of FIGURES 2 to 4. As shown in FIGURE 6, a pressure line 200 is connected to any suitable pressure source which may be the upstream side of the pipeline being controlled by the main valve, as shown in FIGURE 1, or it may be a separate and independent pressure source, such as compressed air. Pressure line 200 is connected directly to reservoir assembly 49 to maintain a normal supply of sealant to the main valve through sealant conductor 47. Pressure line 200 is also connected to a three-way intensifier control valve 202 which is shown in an intensifier operating position in FIGURE 6 wherein a passage 204 transmits pressure operating fluid to intensifier conduit 206 connected to the intensifier assembly 50.

Three-way control valve 202 also includes an exhaust passage 208 which is effective to connect intensifier conduit 206 to an atmospheric vent 210 upon return of three-way valve 202 to its normal position. The valve 202 may be a rotary valve as shown in FIGURE 1 or a slide valve; it may be manually operated or solenoid operated, the latter being adapted for control from a remote operating station.

FIGURE 7 schematically shows the installation of the jolt injector 48 incorporated in a valve actuator control system for a pneumatic motor driven valve actuator 218. In this installation, a pressure supply line 220 is connected to a suitable source of supply pressure as described above in regard to FIGURE 6 and is directly connected to the supply reservoir assembly 49 of the injector. Pressure supply line 220 is further connected to a control valve 222 which controls not only the operation of the intensifier assembly 50 but also that of a pneumatic motor 224 of actuator 218.

As shown in FIGURE 7, control valve 222 is in a position so that a passage 226 connects pressure supply line 220 directly with intensifier conduit 228 and also to "valve open" conduit 230 connected to one port 232 of valve actuator motor 224. Operating fluid is exhausted from motor 224 through port 234, through conduit 236 to passage 238 in valve 222 and exhausted to atmosphere through a vent 240. Thus control valve 222 is effective to automatically operate sealant intensifier 50 whenever the valve is undergoing an opening operation.

When valve 222 is returned to a normal position, a further passage 242 therein connects intensifier conduit 228 to a further atmospheric vent 244 to allow the intensifier assembly mechanism to refill preparatory to a further intensifier cycle. This same passage 242 vents the pneumatic motor conduit to atmosphere, while passage 226 connects pressure supply line 220 to conduit 236. This connection acts to close the valve. During such operating conditions, actuator conduit 230 is vented to atmosphere. Therefore, as is desirable, no operation of the intensifier assembly occurs during a valve closing operation.

FIGURE 8 shows the jolt injector 48 appropriately connected for automatic control in a control system for a hydraulically operated valve actuator 250. In this system a pressure supply line 252 is connected to a suitable source of supply pressure similar to that described above in connection with FIGURE 6. In this system, however, conduit 252 is connected only to reservoir assembly 49.

The hydraulic connections in the control system of FIGURE 8 include a check valved supply line 254 conducting fluid from a reservoir incorporated within a hydraulic motor 255 of actuator 250 to hydraulic pump 256 which in turn is connected by check-valved conduit 258 to control valve 260. Valve 260 is shown in a "valve opening" position in which a passage 262 connects pump outlet conduit 258 with intensifier conduit 264 and with a "valve open" conduit 266 leading to one port 268 of hydraulic motor 255. Hydraulic fluid exhausts from motor 255 through another port 270 connected by conduit 272 to a passage 274 in the control valve and is returned to the reservoir in motor 255 through return line 276. Thus the sealant intensifier assembly 50 is operated by hydraulic pressure whenever the valve actuator 250 is undergoing a valve opening operation.

When control valve 260 is returned to a neutral position, a further passage 278 therein vents intensifier conduit 264 to a further return line 280 connected to the low pressure reservoir in hydraulic motor 255. Further passages (not shown) are incorporated in control valve 260 to reverse the direction of hydraulic motor 255 to close the main pipeline valve; during this closing operation, sealant intensifier assembly 50 remains vented to the low pressure reservoir in hydraulic motor 250 so that the sealant intensifier does not automatically operate during a valve closing operation.

Figure 9:
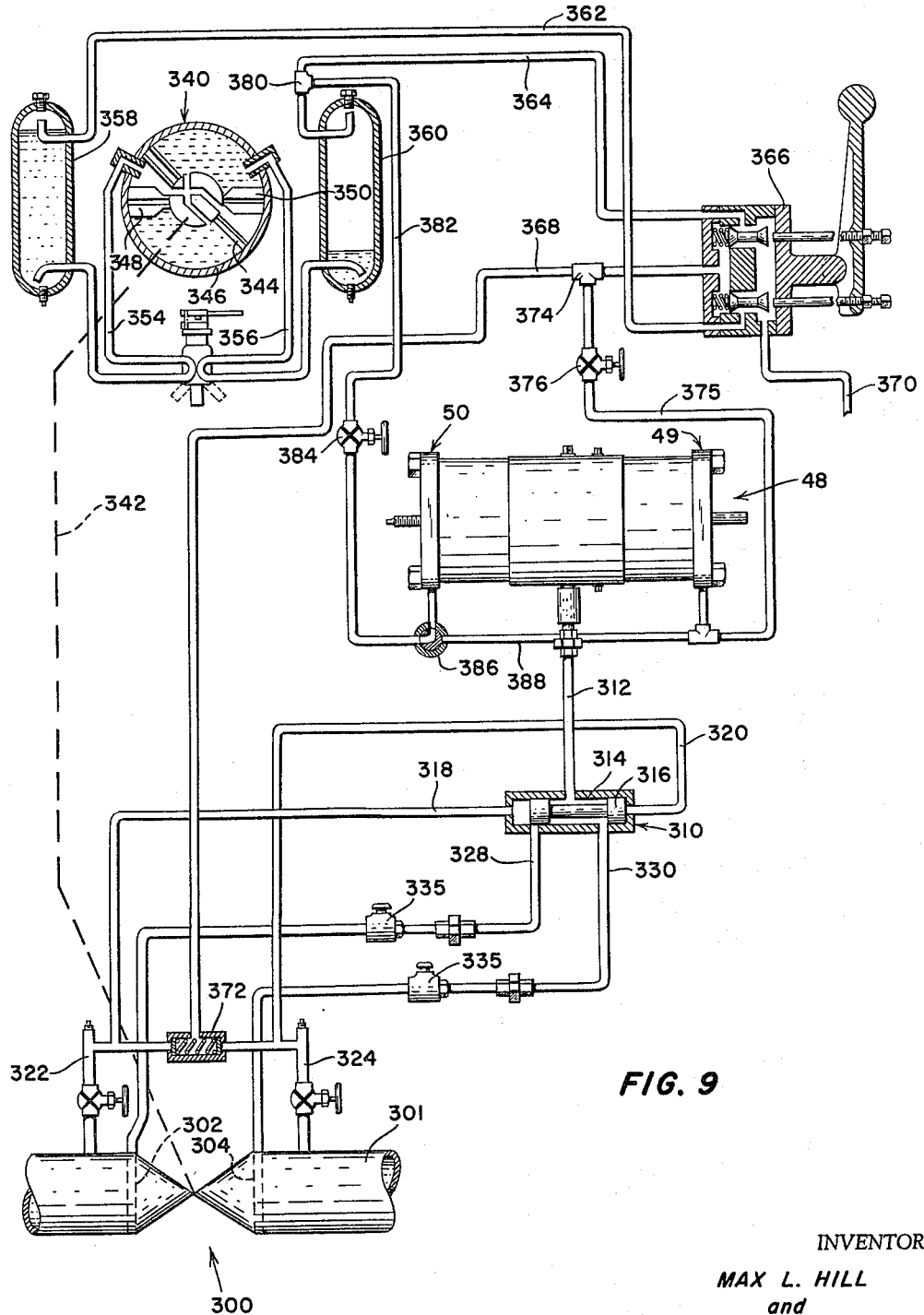
FIGURE 9 is a schematic illustration of the jolt sealant injector of FIGURE 1 connected for automatic operation with a pipeline valve which is subject to reverse flow conditions.

FIGURE 9 schematically illustrates a more complex installation of the jolt sealant injector 48 in which pipeline 301 is controlled by a main spherical valve 300 having opposed valve seats 302 and 304. Flow of the fluid medium in pipeline 301 is reversed occasionally; therefore, either seat 302 or 304 may be a downstream seat at which a jacking action will be required to facilitate a valve opening operation. In order to direct the sealant delivered from jolt sealant injector 48 to the downstream valve seat, an automatic seat selector 310 is provided in sealant conduit 312 leading from injector 48.

Figure 10:
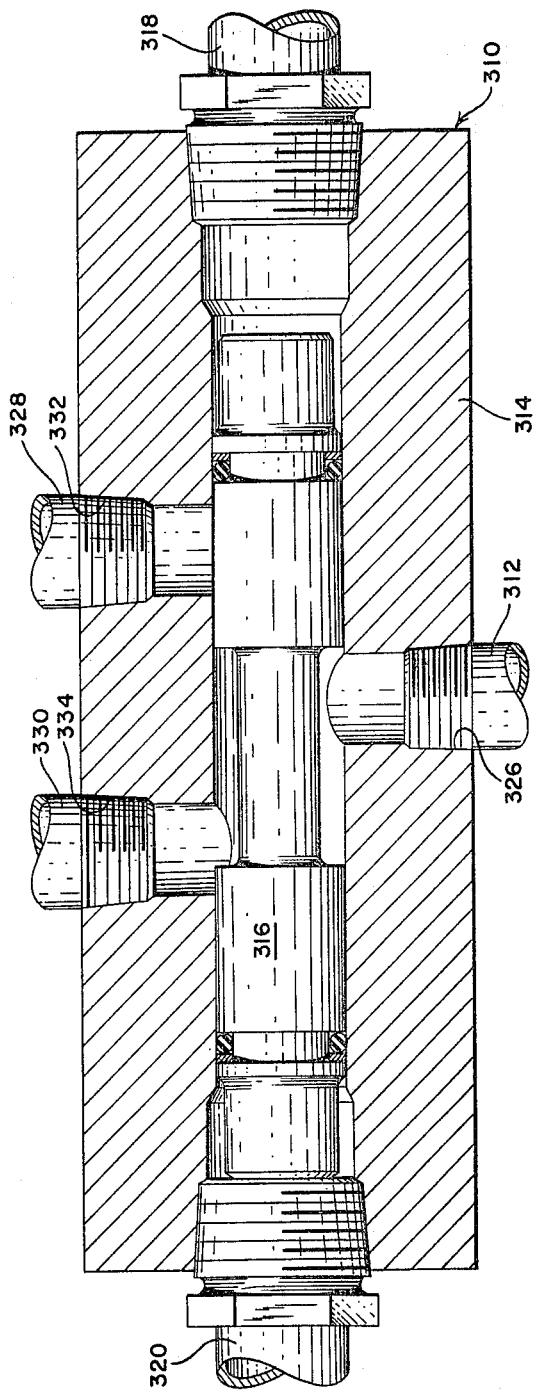
FIGURE 10 is a longitudinal cross section through an automatic seat selector mechanism incorporated in the system of FIGURE 9.

As shown in FIGURES 9 and 10, seat selector 310 includes a main body 314 and a sliding piston 316. The opposite ends of sliding piston 316 are subjected to pipe line pressures conducted thereto by conduits 318 and 320 leading respectively from valved pipeline taps 322 and 324 located on opposite sides of valve 300. As shown, seat selector piston 316 is in a position toward the conduit 320 end of seat selector body 314 thus indicating that a lower pressure exists in conduit 320 than in conduit 318 and that valve seat 304 is the downstream seat.

As further shown in FIGURES 9 and 10, sealant conduit 312 leading from injector 48 connects to a central port 326 in the selector body. Two sealant outlet conduits 328 and 330 connect respective ports 332 and 334 through conventional T-type grease fittings 335 to valve seats 302 and 304, respectively. In the position of the valve seat selector shown in FIGURES 9 and 10, sealant is directed only to the downstream valve seat 304 through the conduit 330.

To operate valve 300, a suitable power actuator 340 is connected to the valve stem thereof, as shown schematically at 342 in FIGURE 9. As shown, the actuator may have a vane type hydraulic motor, as disclosed in the United States Letters Patent No. 2,791,093, having a diametric vane 344 mounted on a central rotary shaft 345 and fitted closely within a cylindrical housing 346. Housing 346 includes two fixed members 348 and 350 which divide the cylinder into two chambers, each of which is radially divided by the diametrically opposed ends of vane 344.

Valve actuator 340 may be selectively rotated 90° in either direction by introduction of pressurized hydraulic fluid thereto through conduits 354 and 356 which respectively lead to hydraulic-gas cylinders 358 and 360. A pressurized gas is conducted to cylinders 358 and 360 through conduits 362 and 364, respectively, from an actuator control valve 366. Control valve 366 serves to direct pressurized operating fluid from a pressure conduit 368 to one of the two valve actuator conduits 362 or 364 and simultaneously vent the other conduit to an atmospheric exhaust 370.

In order to obtain a supply of valve actuating fluid at high pressure in a pipeline which is subject to reverse flow, a double check valve assembly 372 is installed in conduit 368 and is connected to valve taps 322 and 324 on either side of main valve 300. Double check valve 372 is operative to permit pressurized fluid to flow from the high pressure side of valve 300 into pressure supply line 368 and to close off the opposite pipeline tap.

A T-fitting 374 is provided in pressure supply line 368 to pressurize a conduit 375 having a manual shutoff valve 376 therein. Conduit 375 serves to supply constant pressure operating fluid to reservoir assembly 49 of injector 48.

A T-fitting 380 is provided in the "valve open" pressure supply line 364 of the valve actuator to connect with a conduit 382 leading through a manual shutoff valve 384 to an intensifier control valve 386. In the position shown, control valve 386 will direct pressurized operating fluid from conduit 382 to intensifier assembly 50 of the sealant injector during a valve opening operation of the actuator. Upon return of control valve 366 to its neutral position or during a closing operation of the main valve 300, actuator supply line 364 is vented to atmosphere, and thus the intensifier assembly connected thereto remains in its inoperative, charged position.

A cross connection 388 may optionally be provided between the reservoir pressure supply line 375 and intensifier control valve 386 to provide for independent operation of the intensifier.

Structural modification

Figure 11:
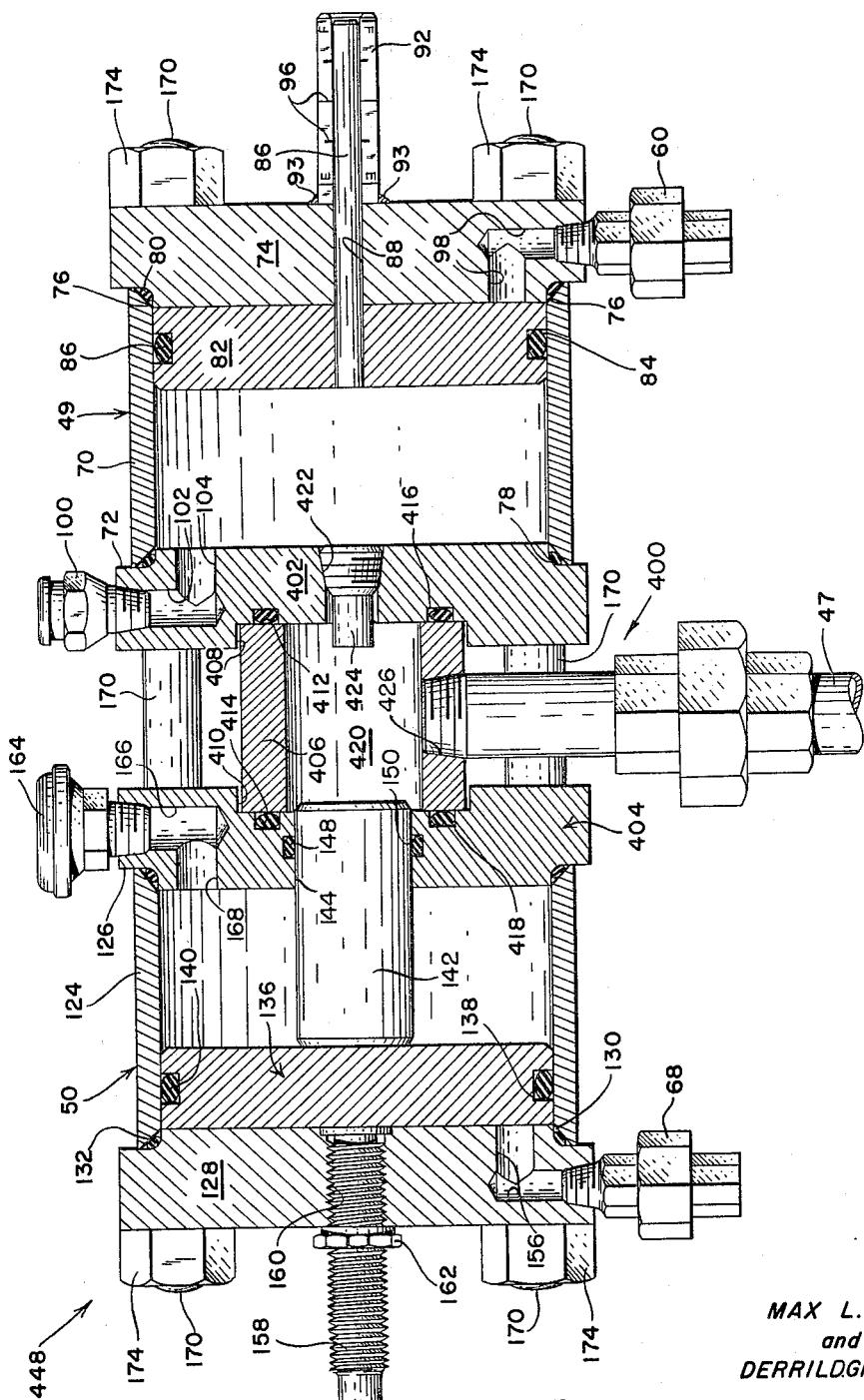
FIGURE 11 is a vertical, longitudinal cross section through a jolt sealant injector according to a modified embodiment of the present invention.

A modified embodiment of the jolt sealant injector of the present invention is shown at 448 in FIGURE 11. Inasmuch as many of the components of this modified structure are the same as corresponding components in the injector of FIGURES 2 to 4 and since the above description thereof is pertinent, the same reference numerals have been used therefor.

The principal area of modification of the injector of FIGURE 11 is in the central injector portion 400 which includes a reservoir end plate 402 incorporating the above described annular peripheral recess 72 and the bores 102 and 104 for grease fitting 100. Central body portion 400 further includes an intensifier end plate 404 incorporating the above described peripheral annular recess 126, bores 166 and 168 for breather assembly 164, and the ram bore 144 with its annular groove 150 containing O-ring 148. A tubular cylinder 406 is clamped between end plates 402 and 404 within circular countersinks 408 and 410, respectively, therein. Cylinder 406 is sealed with respect to the end plates 402 and 404 by O-rings 412 and 414 retained within respective annular grooves 416 and 418 located in the bottom of the end plate countersinks.

Central cylinder 406 forms a ram chamber 420 concentrically connecting with the ram bore 144 in intensifier end plate 404. Reservoir end plate 402 is further provided with a central threaded bore 422 therethrough into which a ball check valve assembly 424 is threaded to permit flow of sealant only from the reservoir assembly 49 to ram chamber 420. In this embodiment, the sealant conduit 47 is threaded directly into a bore 426 provided centrally in the side wall of ram chamber cylinder 406, however a check valve assembly may also be incorporated at the ram chamber outlet for the same purpose described above for assembly 54 of FIGURES 2 to 4.

The operation of the jolt sealant injector of FIGURE 11 is substantially the same as that of the injector of FIGURE 2 described above and to which reference should be made.

It should also be recognized that, in some applications of jolt sealant injectors of the present invention, it may be desirable to further provide a sealant conducting conduit (not shown) leading directly from the pressurized sealant reservoir to the upstream valve seat of a pipeline valve thus bypassing the ram chamber. This conduit would then be effective to provide a continuous, normal supply of pressurized sealant to the upstream seat unaffected by any operation of the intensifier assembly in the sealant conduit leading to the downstream valve seat.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a pipeline valve adapted for reversible flow therethrough having: opposed valve seats at opposite flow ends thereof, a valve member adapted to slidingly engage said valve seats, means for conducting a lubricating sealant to said valve seats to form a lubricating and sealing film therebetween, a controllable pipeline pressure operated actuating means for said valve, and switching conduit means to automatically connect said valve actuating means to said pipeline on the upstream side of said valve, regardless of the direction of pipeline fluid flow; a jolt sealant injector comprising:
   (a) pressurized sealant reservoir means connected to said switching conduit means to supply pipeline pressure thereto;
   (b) means connecting said sealant reservoir means to said sealant conducting means of said valve to supply pressurized sealant to form the sealing, lubricating film at said valve seats;
   (c) sealant pressure intensifier means communicating with said sealant connecting means to intermittently, substantially increase the sealant pressure to said valve seats to jack said valve member therefrom to facilitate movement thereof;
   (d) fluid pressure means operating said intensifier means and connecting with said controllable fluid pressure valve actuating means for automatic operation of said intensifier means during a valve opening operation; and (e) means in said sealant connecting means to automatically direct sealant to the downstream valve seat regardless of the direction of pipeline fluid flow.

2. The combination as defined in claim 1 together with conduit means to selectively, directly connect said fluid pressure intensifier operating means to said switching conduit means to provide for independent operation of said intensifier means.

3. In a system for controlled supply of fluent sealant material to the space between the relatively movable seating surfaces of a plug valve and body of a valve assembly mounted in a pipeline for conveying fluid under pressure, means defining a reservoir chamber for a mass of said sealant, means defining a passage for connecting said reservoir chamber to said space, said passage having therein a pressure intensifier chamber and check valve means permitting flow of sealant into said pressure intensifier chamber but preventing flow of sealant from said pressure intensifier chamber to said reservoir chamber, means for maintaining a predetermined pressure on the sealant in said reservoir chamber sufficient to open the check valve means and thereby establish and maintain a line pressure resistant film of said material of sealing thickness in said space, and periodically operable fluid pressure means for greatly increasing the pressure of said material in said intensifier chamber to correspondingly increase the pressure of said material in said space.

4. In the system defined in claim 3, said means for maintaining a predetermined pressure on the sealant comprising a fluid pressure responsive element in said reservoir chamber and conduit means for applying upstream pipeline pressure to said element to bias said element against said mass of material in the reservoir chamber.

5. In the system defined in claim 4, means for indicating the amount of sealant in said reservoir comprising an indicator member movable with said element and projecting through a wall of said reservoir, and index means on said wall cooperating with said rod.

6. In the system defined in claim 3, conduit means for connecting upstream fluid pressure to said periodically operable fluid pressure means, and valve means in said conduit means for periodically actuating said fluid pressure means.

7. In the system defined in claim 3, a fluid pressure responsive operator operably connected to move the valve plug within said body and means responsive to actuation of said operator to effect valve opening movement of the plug for connecting said fluid pressure means to a source of actuating fluid pressure.

8. In the assembly defined in claim 7, said source being upstream pipeline pressure.

9. In the assembly defined in claim 7, said source being the fluid pressure circuit of said operator.

10. In the system defined in claim 8, means automatically connecting said fluid pressure means to be operated by upstream line pressure regardless of the direction of fluid flow in the pipeline.

11. In the system defined in claim 3, said fluid pressure means being effective to displace a predetermined amount of said material from said intensifier chamber into said space, and said pressure means being automatically operable to displace material from said reservoir to replenish said intensifier chamber during periods between actuation of said fluid pressure means.

12. In the system defined in claim 3, said means for maintaining pressure on the sealant being a second fluid pressure means operable upon said mass within the reservoir having a fluid pressure supply conduit, and a valved conduit connecting said supply conduit to said periodically operable fluid pressure means.

13. In the system defined in claim 3, an operator actuatable for moving said plug between valve open and closed positions, and means automatically responsive only to actuation of said operator to move the plug to valve open position for actuating said periodically operable fluid pressure responsive means.

14. In the system defined in claim 3, said passage being connected only to the space between the downstream seating surfaces of the plug and body in said pipeline.

15. In the system defined in claim 3, said reservoir chamber being a cylinder wherein a piston is slidably mounted to separate the reservoir chamber into a fluent material space connected to said passage and a fluid pressure space for receiving fluid under pressure to urge said piston against said material, said means for increasing the pressure of material in said intensifier chamber comprises a piston actuated by a source of fluid pressure and connected by a smaller diameter ram to said intensifier chamber.

16. In combination with a pipeline valve having a valve seat, a valve member to slidably engage said seat, a fluid operated actuator having a fluid port adapted to be supplied with pressurized fluid to open said valve, and means for conducting a fluent sealant to said valve seat to form a pipeline pressure sealing film between said seat and said member, a jolt sealant injector comprising a pressurized sealant reservoir means, means connecting said reservoir means to said sealant conducting means in said valve, and means for selectively intensifying the sealant pressure in said connecting means to hydraulically displace said valve member with respect to said valve seat to facilitate introduction of sealant and sliding movement therebetween, said sealant pressure intensifying means comprises a ram chamber communicating with said reservoir connecting means, a ram fitting within said chamber and a fluid operated piston with an enclosing cylinder connected to drive said ram into said chamber, and said cylinder of said intensifier ram being connected to said actuator port to automatically jack said valve member from said valve seat during an opening operation of said valve.

17. In combination with a pipeline valve adapted for reverse fluid flow therethrough having two valve seats each adapted to be alternatively the upstream or downstream seat, a valve member to slidingly engage said seats, and means for conducting a fluent sealant to both of said valve seats to form a pipeline pressure sealing film between said seats and said member including means to automatically direct sealant only to the downstream seat, a jolt sealant injector comprising a pressurized sealant reservoir means, means connecting said reservoir means to said sealant conducting means in said valve, and means for selectively intensifying the sealant pressure in said connecting means to hydraulically displace said valve member with respect to said valve seat to facilitate introduction of sealant and sliding movement therebetween.

18. A jolt sealant injector for a pipeline valve requiring a lubricating film of sealant between the engaging surfaces of a valve member and a valve seat thereof comprising pressurized sealant reservoir means including a reservoir cylinder having connecting means adapted to continuously supply sealant under pressure to the valve seat, and means to intermittently intensify the pressure of the sealant in said connecting means comprising an intensifier cylinder, a central ram chamber defining member connected between said cylinders, said reservoir cylinder having a piston therein biased to maintain pressure on the sealant in said reservoir cylinder to urge said sealant into said ram chamber member, said intensifier cylinder having an intermittently operable piston having a ram extending into said ram chamber member to intensify pressure of the sealant therein, and said connecting means communicating with said ram chamber member to conduct sealant therefrom, said intensifying means thereby being adapted to jack the valve member from the valve seat.

19. The jolt sealant injector as defined in claim 18 together with means to limit the stroke of said intensifier piston and its associated ram.

20. The jolt sealant injector as defined in claim 18 wherein said cylinders and said central ram chamber member are coaxially positioned and are secured together by longitudinally extending fastening means bearing against the outer ends of said cylinders.

References Cited by the Examiner

UNITED STATES PATENTS

| | | | |
|---|---|---|---|
| 1,697,399 | 1/1929 | Meyer | 137—12 |
| 1,940,378 | 12/1933 | Sutiff | 137—246.11 |
| 2,071,913 | 2/1937 | Bentley | 87—6 |
| 2,086,725 | 7/1937 | McCausland | 137—246.13 |
| 2,187,926 | 1/1940 | Aikman | 137—246.12 |
| 2,299,517 | 10/1942 | Volpin | 137—246.12 |
| 2,572,894 | 10/1951 | Volpin | 137—246.12 X |
| 2,733,725 | 2/1956 | Zachariassin | 137—12 |
| 2,807,278 | 9/1957 | Bandy | 137—246.22 |
| 2,979,071 | 4/1961 | Herring | 137—246.13 |
| 3,010,539 | 11/1961 | Goff | 137—246.22 X |
| 3,052,317 | 9/1962 | Leach | 137—246.13 X |
| 3,190,304 | 6/1965 | Volpin | 137—246.12 |

WILLIAM F. O'DEA, *Primary Examiner.*

CLARENCE R. GORDON, *Examiner.*